US012367373B2

(12) United States Patent
Haarnoja

(10) Patent No.: US 12,367,373 B2
(45) Date of Patent: Jul. 22, 2025

(54) CONTROLLING ROBOTS USING ENTROPY CONSTRAINTS

(71) Applicant: Google LLC, Mountain View, CA (US)

(72) Inventor: Tuomas Haarnoja, Berkeley, CA (US)

(73) Assignee: Google LLC, Mountain View, CA (US)

( * ) Notice: Subject to any disclaimer, the term of this patent is extended or adjusted under 35 U.S.C. 154(b) by 1087 days.

(21) Appl. No.: 17/297,902

(22) PCT Filed: Dec. 2, 2019

(86) PCT No.: PCT/US2019/064047
§ 371 (c)(1),
(2) Date: May 27, 2021

(87) PCT Pub. No.: WO2020/113228
PCT Pub. Date: Jun. 4, 2020

(65) Prior Publication Data
US 2022/0019866 A1    Jan. 20, 2022

Related U.S. Application Data

(60) Provisional application No. 62/773,932, filed on Nov. 30, 2018.

(51) Int. Cl.
*G06N 3/008* (2023.01)
(52) U.S. Cl.
CPC .................... *G06N 3/008* (2013.01)
(58) Field of Classification Search
CPC ...... G06N 3/008; G06N 3/0464; G06N 3/092; G06N 3/0985; G06N 3/084
See application file for complete search history.

(56) References Cited

U.S. PATENT DOCUMENTS 11,880,775 B1 * 1/2024 Hazard ................ G06N 5/04
2017/0140270 A1   5/2017 Mnih et al.
(Continued)

FOREIGN PATENT DOCUMENTS

CN        108027897        5/2018

OTHER PUBLICATIONS

Haarnoja et al., "Soft actor-critic: off-policy maximum entropy deep reinforcement learning with a stochastic actor," CoRR, Submitted on Jan. 4, 2018, arXiv:1801.01290v1, pp. 1-15.
(Continued)

*Primary Examiner* — Hien L Duong
(74) *Attorney, Agent, or Firm* — Fish & Richardson P.C.

(57) ABSTRACT

Methods, systems, and apparatus, including computer programs encoded on computer storage media, for training a policy neural network having policy parameters. One of the methods includes obtaining trajectory data comprising one or more tuples; updating, using the trajectory data, current values of the policy parameters using a maximum entropy reinforcement learning technique that maximizes both (i) a reward term and (ii) an entropy term, wherein a relative weight between the entropy term and the reward term in the maximization is determined by a temperature parameter; and updating, using the probability distributions defined by the policy outputs generated in accordance with the current values of the policy parameters for the tuples in the trajectory data, the temperature parameter to regulate an expected entropy of the probability distributions to at least equal a minimum expected entropy value.

18 Claims, 3 Drawing Sheets

(56) References Cited

U.S. PATENT DOCUMENTS

| | | | |
|---|---|---|---|
| 2017/0147722 A1* | 5/2017 | Greenwood | G16B 5/20 |
| 2019/0122081 A1* | 4/2019 | Shin | G06N 3/082 |
| 2019/0156197 A1* | 5/2019 | Dasgupta | G06N 3/08 |
| 2019/0354859 A1* | 11/2019 | Xu | G06N 3/084 |
| 2020/0151562 A1* | 5/2020 | Pietquin | G06N 3/092 |
| 2020/0285939 A1* | 9/2020 | Baker | G06N 3/045 |
| 2021/0158162 A1* | 5/2021 | Hafner | G06N 3/006 |

OTHER PUBLICATIONS

Jianxian et al., "Autonomous navigation for Mobile Robot Based on Cognitive Development," Computer Engineering, Jan. 2018, 44(1):9-16 (with English abstract).
Office Action in Chinese Appln. No. 201980077793.8, mailed on Jun. 22, 2024, 20 pages (with English translation).
Office Action in Chinese Application No. 201980077793.8, dated Jan. 24, 2024, 8 pages.
Office Action in European Application No. 19836712.0, dated Jan. 17, 2024, 9 pages.
Berseth et al., "Progressive reinforcement learning with distillation for multi-skilled motion control," Published as a Conference Paper at ICLR 2018, Vancouver, BC, Canada, Feb. 2018, 15 pages.
Brockman et al., "OpenAI gym," Machine Learning, Cornell University, arXiv preprint arXiv:1606.01540, Jun. 2016, 4 pages.
Calandra et al., "Bayesian optimization for learning gaits under uncertainty," Annals of Mathematics and Artificial Intelligence, Feb. 2016, 19 pages.
Eysenbach et al., "Leave no trace: Learning to reset for safe and autonomous reinforcement learning," Machine Learning, Cornell University, arXiv preprint arXiv:1711.06782, Nov. 2017, 13 pages.
Fujimoto et al., "Addressing function approximation error in actor-critic methods," International Conference on Machine Learning 2018, Stockholmsmässan, Stockholm, Sweden, Jul. 2018, 10 pages.
Ha et al., "Automated deep reinforcement learning environment for hardware of a modular legged robot," 2018 15th International Conference on Ubiquitous Robots (UR), Hawaii Convention Center, Honolulu, Hawaii, USA, Jun. 2018, 7 pages.
Haarnoja et al., "Composable deep reinforcement learning for robotic manipulation," 2018 IEEE International Conference on Robotics and Automation (ICRA), Brisbane Convention & Exhibition Centre, Brisbane, Australia, May 2018, 10 pages.
Haarnoja et al., "Latent space policies for hierarchical reinforcement learning," International Conference on Machine Learning 2018, Stockholmsmässan, Stockholm, Sweden, Jul. 2018, 10 pages.
Haarnoja et al., "Reinforcement learning with deep energy-based policies," Proceedings of the 34th International Conference on Machine Learning 2017, International Convention Centre, Sydney Australia, Jul. 2017, 10 pages.
Haarnoja et al., "Soft actor-critic algorithms and applications," Machine Learning, Cornell University, arXiv preprint arXiv:1812.05905, Dec. 2018, 17 pages.
Haarnoja et al., "Soft actor-critic: Off-policy maximum entropy deep reinforcement learning with a stochastic actor," International Conference on Machine Learning 2018, Stockholmsmässan, Stockholm, Sweden, Jul. 2018, 10 pages.
Hasselt et al., "Double Q-learning," Advances in Neural Information Processing Systems Conference, Vancouver, British Columbia, Canada, Dec. 2010, 9 pages.
Heess et al., "Emergence of locomotion behaviors in rich environments," Artificial Intelligence, Cornell University, arXiv preprint arXiv:1707.02286, Jul. 2017, 14 pages.
Henderson et al., "Deep reinforcement learning that matters," Proceedings of the AAAI Conference on Artificial Intelligence 2018, Hilton New Orleans Riverside, New Orleans, Louisiana, USA, Apr. 2018, 8 pages.
Kenneally et al., "Design principles for a family of direct-drive legged robots," IEEE Robotics and Automation Letters, Feb. 2016, 10 pages.
Kingma et al., "Adam: A method for stochastic optimization," Published as a Conference Paper at ICLR 2015, The Hilton San Diego Resort & Spa, San Diego, California, USA, 2015, 15 pages.
Kingma et al., "Auto-encoding variational bayes," Machine Learning, Cornell University, arXiv preprint arXiv:1312.6114, Dec. 2013, 14 pages.
Kohl et al., "Policy gradient reinforcement learning for fast quadrupedal locomotion," IEEE International Conference on Robotics and Automation 2004, New Orleans, La, USA, Apr. 2004, 6 pages.
Lillicrap et al., "Continuous control with deep reinforcement learning," Published as a Conference Paper at ICLR 2016, Caribe Hilton, San Juan, Puerto Rico, Sep. 2015, 14 pages.
Nachum et al., "Smoothed action value functions for learning gaussian policies," International Conference on Machine Learning 2018, Stockholmsmässan, Stockholm, Sweden, Jul. 2018, 9 pages.
PCT International Preliminary Report on Patentability in International Appln. No. PCT/US2019/064047, dated Jun. 1, 2021, 10 page.
PCT International Search Report and Written Opinion in International Appln. No. PCT/US2019/064047, dated Apr. 15, 2020, 12 pages.
Peng et al., "Terrain-adaptive locomotion skills using deep reinforcement learning," ACM Transactions on Graphics (TOG), Jul. 2016, 35(4):1-12.
Rai et al., "Bayesian optimization using domain knowledge on the ATRIAS biped," 2018 IEEE International Conference on Robotics and Automation (ICRA), Brisbane Convention & Exhibition Centre, Brisbane, Australia, May 2018, 8 pages.
Tan et al., "Sim-to-real: Learning agile locomotion for quadruped robots," Robotics, Cornell University, arXiv preprint arXiv:1804.10332, Apr. 2018, 11 pages.
Tedrake et al., "Learning to walk in 20 minutes," Proceedings of the Fourteenth Yale Workshop on Adaptive and Learning Systems, Center for Systems Science, Dunham Laboratory, Department of Electrical Engineering, Yale University, New Haven, Connecticut, USA, Jun. 2005, vol. 95585, 6 pages.
Xie et al., "Feedback control for cassie with deep reinforcement learning," 2018 IEEE/RSJ International Conference on Intelligent Robots and Systems (IROS), Madrid, Spain, Oct. 2018, 6 pages.
Office Action in Chinese Appln. No. 201980077793.8, mailed on Sep. 30, 2024, 6 pages (with English translation).

* cited by examiner

CONTROLLING ROBOTS USING ENTROPY CONSTRAINTS

CROSS-REFERENCE TO RELATED APPLICATION

This application is a national phase entry under 35 U.S.C. of PCT Application Serial No. PCT/US2019/064047, filed Dec. 2, 2019, which claims priority to U.S. Patent Application No. 62/773,932, filed Nov. 30, 2018, the entirety of which is hereby incorporated by reference. The entirety of each of the foregoing is incorporated by reference.

BACKGROUND

This specification relates to controlling robots to perform particular tasks.

Some systems control a robot using a policy neural network that generates outputs that define a probability distribution over actions that can be performed by the robot, i.e., the systems select the actions to be performed by the robot in accordance with outputs generated by the policy neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as one or more computer programs on one or more computers in one or more locations that trains a policy neural network. The policy neural network is used to control a robot in order to cause the robot to perform a particular task in an environment. For example, the task may be an industrial robotic task that involves navigating in the environment, moving objects in the environment, or both.

Particular embodiments of the subject matter described in this specification can be implemented so as to realize one or more of the following advantages.

Applying deep reinforcement learning methods on real-world robots is exceptionally difficult, due both to the sample complexity of the deep reinforcement learning methods (i.e., the number of training samples required to learn an effective control policy) and, just as importantly, the sensitivity of such methods to hyperparameters. In particular, it can be problematic to tune hyperparameters directly on real-world robotic platforms, i.e., ones that involve a real-world robot interacting with a real-world environment. More specifically, robots, e.g., quadrupedal robots or other moving robots, can be damaged or at least severely worn down through the extensive trial-and-error learning that is conventionally required to determine an effective hyperparameter setting for the hyperparameters of a reinforcement learning training process.

In particular, in maximum entropy reinforcement learning, the relative weight between the entropy term and the reward term in the maximization is determined by a parameter, which is referred to as a temperature parameter. Conventional maximum entropy reinforcement learning techniques require extensive hyperparameter tuning to determine the best setting for the temperature parameter for a given task. When the policy is being learned on a real-world robot, this hyperparameter search can result in the damage, wear, or both to the robot before the training process even begins.

The described techniques, however, require minimal to no hyperparameter tuning because the temperature parameter is learned during the training of the policy neural network. In other words, the claimed techniques automatically trade off exploration against exploitation by dynamically and automatically tuning the temperature parameter that determines the stochasticity of the policy. Thus, a control policy can effectively be determined without excessive wear or damage to the real-world robot because the need for trial-and-error learning is reduced or even eliminated.

Additionally, the described techniques automatically adjust the temperature parameter as the policy improves time during the training. This can further reduce the number of training iterations and the amount of wear on the robot required to learn a high quality control policy for the robot. More generally, automatically tuning the temperature parameter results in the policy being free to explore more in regions where the optimal action is uncertain, but remain more deterministic in states with a clear distinction between good and bad actions, improving the quality of the final policy that is learned.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
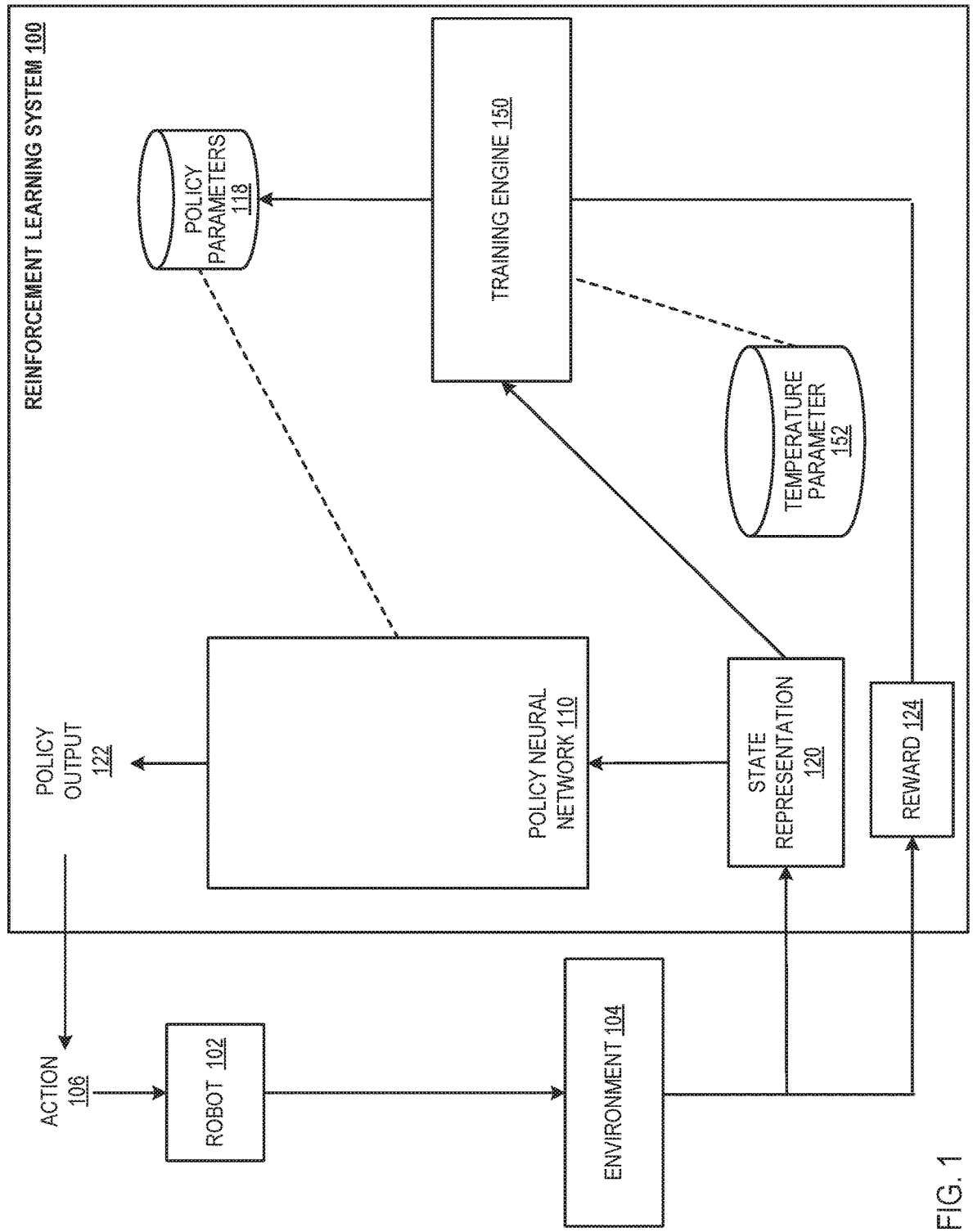
FIG. 1 shows an example control system.

FIG. 1 shows an example control system 100. The control system 100 is an example of a system implemented as computer programs on one or more computers in one or more locations in which the systems, components, and techniques described below are implemented.

The system 100 includes a policy neural network 110, a training engine 150, and one or more memories storing a set of policy parameters 118 of the policy neural network 110 and a temperature parameter 152.

The system 100 controls a robot 102 interacting with an environment 104 by selecting actions 106 to be performed by the robot 102 and then causing the robot 102 to perform the selected actions 106.

Performance of the selected actions 106 by the robot 102 generally causes the environment 104 to transition into new states. By repeatedly causing the robot 102 to act in the environment 104, the system 100 can control the robot 102 to complete a specified task. For example, the task may be an industrial robotic task that involves navigating in the environment, moving objects in the environment, or both.

In particular, the control system 100 controls the robot 102 using a policy neural network 110 in order to cause the robot 102 to perform the specified task in the environment 104.

The policy neural network 110 is a neural network having parameters (referred to in this specification as "policy parameters") that receives a state representation 120 characterizing a state of the environment 104 being interacted with by the robot 102 and generates a policy output 122 that defines a probability distribution over a set of possible actions that can be performed by the robot 102.

Each action in the set of possible actions is generally a multi-dimensional action, e.g., a multi-dimensional vector. For example, each dimension can correspond to a different joint or motor of the robot 102 and can be a control input for the joint or motor, e.g., a torque to be applied to the joint or a position or setting for the motor. As one example, if the robot is controlled by eight actuator motors positioned at different points along the frame of the robot, each action will generally be an eight-dimensional vector, with each dimension corresponding to one of the eight motors and the value at that dimension being a desired motor position for that motor.

When the set of actions is discrete, the policy output 122 can include a respective probability for each action in the set. When the set of actions is continuous, the policy output 122 can include, for each dimension, parameters of a distribution over possible values for the dimension, e.g., means and covariances of Gaussian distributions.

Generally, the state representation 120 is generated from sensor data captured by sensors of the robot 102. For example, the state representation 120 can include an observation that includes one or more sensor readings that characterize the current state of the robot 102, e.g., sensors that measure the angles of certain joints or motors of the robot 102, an IMU that measures orientation and angular velocity of the robot 102, and so on.

In some cases, the observation can also include an image captured by a camera sensor, laser data captured by a laser sensor, or both.

In some cases, the state representation 120 includes additional data, e.g., one or more recently received observations in addition to the current observation, data specifying the most recent action performed by the robot, or data specifying the most recent reward 124 received by the system 100.

The policy neural network 110 can have any appropriate neural network architecture that allows the policy neural network 110 to map a received state representation 120 to a policy output 122. For example, when the state representations 120 include high-dimensional images or laser data, the policy neural network 110 can be a convolutional neural network. As another example, when the state representations 120 include only relatively lower-dimensional inputs, e.g., sensor readings that characterize the current state of the robot, the policy neural network 110 can be a multi-layer perceptron.

The system 100 uses the policy output 122 to control the robot, i.e., to select the action 106 to be performed by the robot at the current time step in accordance with an action selection policy and then cause the robot to perform the action 106, e.g., by directly transmitting control signals to the robot or by transmitting data identifying the action 106 to a control system for the robot 102.

The system 100 can select the action to be performed by the robot 102 based on the action selection output 122 using any of a variety of action selection policies, e.g., by sampling an action in accordance with the probability values for the actions, or by selecting the action with the highest probability value.

The system 100 can receive a respective reward 124 at each time step, where the reward 124 is specified by a scalar numerical value and characterizes, e.g., a progress of the robot 102 towards completing the specified task.

In order to improve the control of the robot 102, the training engine 150 repeatedly updates the policy parameters 118 of the policy neural network 110 to cause the policy neural network 110 to generate more accurate policy outputs, i.e., policy outputs that result in higher rewards 124 being received by system 100 and, as a result, improve the performance of the robot 102 on the desired task. In other words, the training engine 150 trains the policy neural network 110 by repeatedly updating the policy parameters 118.

In particular, the training engine 150 updates the policy parameters 118 using a maximum entropy reinforcement learning technique. In such a technique, the training engine 150 updates the policy parameters 118 to maximize both (i) a reward term that measures total rewards in tuples in the trajectory data used for the updating and (ii) an entropy term that measures an entropy of probability distributions defined by policy outputs generated by processing the state representations in the tuples in the trajectory data in accordance with the current values of the policy parameters 118. While the entropy term is referred to throughout as measuring the 'entropy' of the probability distributions, it will be understood that when the action space is continuous (and the output of the policy network are parameters of the continuous probability distribution) the entropy term generally measures the differential entropy of the probability distributions.

Each trajectory in the trajectory data is a sequence of tuples, with each tuple including a state representation, an action that was performed in response to the state representation, and the reward that was received in response to the robot performing the action.

The relative weight between the entropy term and the reward term in the maximization is determined by a parameter referred to as the temperature parameter 152. For example, the entropy term can be multiplied by the temperature parameter in the overall objective that is being optimized. That is, the objective function can include an overall term that is the difference between the reward term and the product of the temperature parameter 152 and the entropy term.

In particular, the objective function $J(\pi)$ can satisfy:

$$J(\pi) = \Sigma_{t=0}^{T} E_{\tau \sim p\pi}[r(s_t, a_t) - \alpha \log(\pi(s_t, a_t))],$$

where E is the expectation operator, r is a trajectory sampled from the trajectory distribution induced by the policy neural network $\pi$, i.e., a trajectory generated by selecting actions from policy outputs 122 generated by the policy neural network 110, that includes time steps 0 through T, r $(s_t, a_t)$ is the reward received by the system 100 as a result of the robot 102 performing an action $a_t$ in response to a state representation $s_t$, $\pi(s_t, a_t)$ is the probability assigned to the action $a_t$ in the probability distribution generated by processing the state representation $s_t$ using the policy neural network, and a is the temperature parameter.

Unlike conventional maximum entropy reinforcement learning techniques which treat the temperature parameter 152 as a hyperparameter that must be set prior to training, the training engine 152 also repeatedly updates the temperature parameter 152 while updating the policy parameters 118, i.e., jointly with training the policy neural network 110. In particular, the training engine 150 repeatedly updates the temperature parameter 152 to regulate an expected entropy of the probability distributions defined by outputs of the policy neural network 110 to at least equal, i.e., to be greater than or equal to, a minimum expected entropy value.

Training the policy neural network 110 and updating the temperature parameter 152 are described in more detail below with reference to FIGS. 2 and 3.

Figure 2:
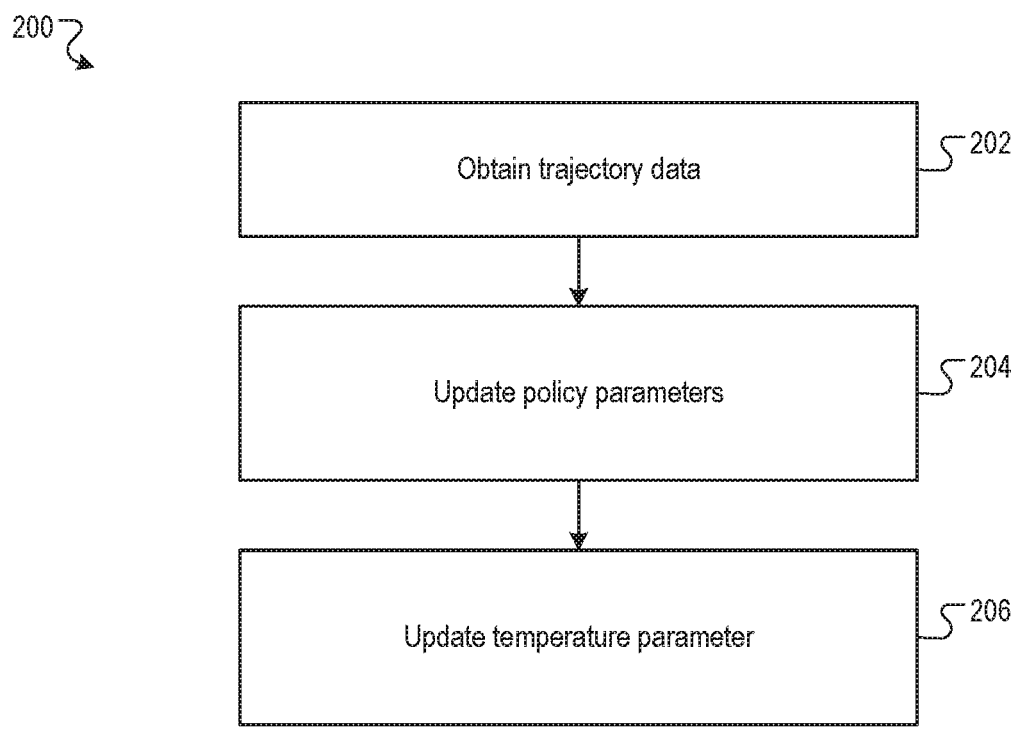
FIG. 2 is a flow diagram of an example process for training the policy neural network.

FIG. 2 is a flow diagram of an example process 200 for training the policy neural network. For convenience, the process 200 will be described as being performed by a system of one or more computers located in one or more locations. For example, a control system, e.g., the control system 100 of FIG. 1, appropriately programmed, can perform the process 200.

The system can repeatedly perform the process 200 on trajectory data, e.g., trajectory data sampled from a replay buffer or other memory that stores trajectory data generated as a result of the robot interacting with the environment (while controlled by the policy neural network or by some other control policy), to train the policy neural network and, jointly, with the training, adjust the temperature parameter.

The system obtains trajectory data (step 202). The trajectory data includes one or more tuples, with each tuple identifying a state representation characterizing a state of the environment, an action performed by the robot when the environment was in the state characterized by the state representation, a reward received in response to the robot performing the action, and a next state representation characterizing a next state of the environment after the robot performed the action.

The system updates, using the trajectory data, current values of the policy parameters using a maximum entropy reinforcement learning technique that maximizes both (i) a reward term that measures total rewards in the tuples in the trajectory data and (ii) an entropy term that measures an entropy of probability distributions defined by policy outputs generated by processing the state representations in the tuples in the trajectory data in accordance with the current values of the policy parameters, with the relative weight between the entropy term and the reward term in the maximization being determined by the current temperature parameter (step 204).

Generally, as part of this updating, the system processes each state representation in each tuple in the trajectory data using the policy neural network to generate a policy output for the state representation in accordance with current values of the policy parameters.

More specifically, the system can determine the update using the current temperature parameter and any appropriate maximum entropy reinforcement learning technique. As a particular example, the system can use the Soft Actor-Critic (SAC) algorithm to determine the update to the current values of the policy parameters. In the SAC algorithm, the entropy term is scaled by the current temperature parameter value, i.e., multiplied by the current temperature parameter value, before errors and gradients are computed. The SAC algorithm is described in more detail in Haarnoja, et al, "Soft Actor-Critic: Off-Policy Maximum Entropy Deep Reinforcement Learning with a Stochastic Actor," 2018, available at arXiv:1801.01290.

The system updates, using the probability distributions defined by the policy outputs generated in accordance with the current values of the policy parameters for the tuples in the trajectory data, the temperature parameter (step 206). In particular, the system updates the temperature parameter to regulate an expected entropy of the probability distributions defined by the policy outputs to at least equal a minimum expected entropy value.

The minimum expected entropy value is a fixed value that regulates the expected minimum entropy of the probability distributions defined by the policy outputs generated by the policy neural network during training.

In some implementations, the minimum expected entropy is a constant that is provided as input to the system.

In some other implementations, the system determines the minimum expected entropy value before training. For example, when the action space is continuous, the minimum expected entropy value can be determined based on the number of action dimensions in the actions in the possible set of actions. As a particular example, the minimum expected entropy value can be the negative of the number of action dimensions, i.e., so that when there are eight action dimensions, the minimum expected entropy value would be −8.

Generally, the system determines the update using an objective function that depends on, for each of the probability distributions, the temperature parameter, the entropy of the probability distribution, and the minimum expected entropy value.

As a particular example, the objective function $J(\alpha)$ can satisfy $$J(\alpha)=E_{a_t \sim \pi_t}[-\alpha \log \pi_t(a_t|s_t)-\alpha \overline{H}],$$

where $\alpha$ is the temperature parameter, E is the expectation operator, $a_t$ is an action sampled from the probability distribution generated by the policy neural network $\pi_t$ for a t-th tuple by processing the state representation $s_t$ in the tuple in accordance with the current values of the policy parameters, and $\overline{H}$ is the minimum expected entropy value.

As can be seen from the above formulation of the objective function $J(\alpha)$, because the function ignores the dependency of the probability distributions generated by the policy neural network on the temperature parameter, the optimizer of the objective function $J(\alpha)$ is always plus or minus infinity. Therefore, instead of minimizing $J(\alpha)$, the system takes only one (or a few) gradient steps towards the minimum at each iteration, and then updates $\pi_t$ to better match the updated $\alpha$, i.e., jointly updates the reinforcement learning objective and $J(\alpha)$ through dual gradient descent.

Updating the current temperature parameter is described in more detail below with reference to FIG. 3.

Figure 3:
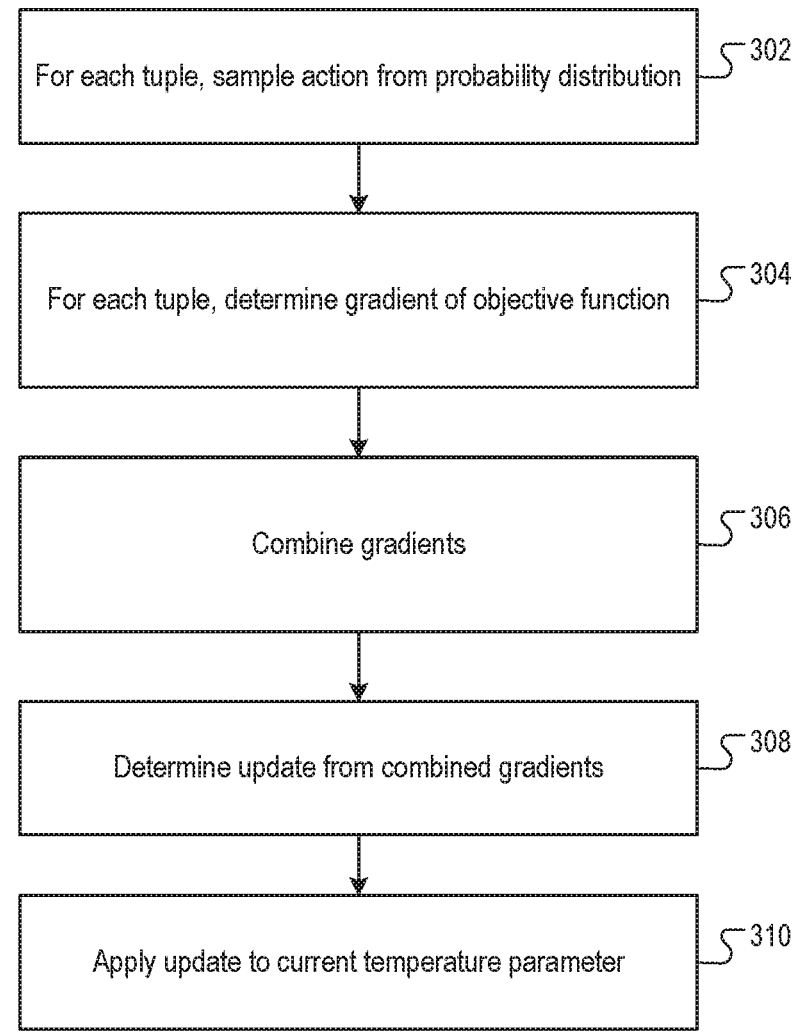
FIG. 3 is a flow diagram of an example process for updating the current temperature parameter.

FIG. 3 is a flow diagram of an example process 300 for updating the current temperature parameter. For convenience, the process 300 will be described as being performed by a system of one or more computers located in one or more locations. For example, a control system, e.g., the control system 100 of FIG. 1, appropriately programmed, can perform the process 300.

For each tuple, the system samples an action from the probability distribution generated by the policy neural network for the tuple (step 302). In other words, the system selects an action from the set of possible actions, with each action having a probability of being selected that is dependent on (e.g. equal to) that action's probability in the probability distribution.

For each tuple, the system determines the gradient of the objective function with respect to the temperature parameter, i.e., determines a difference between (i) a negative of a logarithm of the probability assigned to the sampled action by the probability distribution and (ii) the minimum expected entropy value (step 304).

The system combines the gradients for the tuples (step 306), i.e., by summing or averaging the gradients for the tuples, and determines an update to the temperature parameter from the combined gradients (step 308). The system can determine the update by applying an update rule, e.g., the ADAM update rule or the stochastic gradient descent update rule, to the combined gradient to determine the update.

The system then applies the update to the current temperature parameter, i.e., subtracts the update from the current temperature parameter, to determine an updated temperature parameter (step 310).

The description of the process 300 describes taking one gradient step per tuple to update the temperature parameter. In some cases, the system performs multiple gradient steps, i.e., two, five, or ten, gradient steps before determining the final update to the current temperature parameter for the iteration.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a policy neural network having a plurality of policy parameters and used to control a robot interacting with an environment, wherein the policy neural network is configured to receive as input a state representation characterizing a state of the environment and to process the state representation in accordance with the policy parameters to generate a policy output that defines a probability distribution over a set of actions that can be performed by the robot, the method comprising:
   obtaining trajectory data comprising one or more tuples, each tuple identifying a state representation characterizing a state of the environment, an action performed by the robot when the environment was in the state characterized by the state representation, a reward received in response to the robot performing the action, and a next state representation characterizing a next state of the environment after the robot performed the action;
   updating, using the trajectory data, current values of the policy parameters, the updating comprising:
      determining first gradients of a maximum entropy reinforcement learning objective that includes (i) a reward term that measures total rewards in the tuples in the trajectory data and (ii) an entropy term that measures an entropy of probability distributions defined by policy outputs generated by processing the state representations in the tuples in the trajectory data in accordance with the current values of the policy parameters, wherein a relative weight between the entropy term and the reward term in the maximum entropy reinforcement learning objective is determined by a temperature parameter, and
      updating the current values of the policy parameters using the first gradients;
   updating, using the probability distributions defined by the policy outputs generated in accordance with the current values of the policy parameters for the tuples in the trajectory data, the temperature parameter, comprising:

determining a second gradient with respect to the temperature parameter of a second objective function that regulates an expected entropy of the probability distributions to at least equal a minimum expected entropy value, and updating the temperature parameter using the second gradient; and controlling the robot using the policy neural network and in accordance with the updated values of the policy parameters.

2. The method of claim 1, wherein the second objective function depends on, for each of the probability distributions, the temperature parameter, the entropy of the probability distribution, and the minimum expected entropy value.

3. The method of claim 2, wherein the minimum expected entropy value is based on a number of action dimensions in the actions in the possible set of actions.

4. The method of claim 3, wherein the minimum expected entropy value is a negative of the number of action dimensions.

5. The method of claim 2, wherein the second objective function satisfies:

$$J(\alpha)=E_{a_t \sim \pi_t}[-\alpha \log \pi_t(a_t|s_t)-\alpha \overline{H}],$$

where $\alpha$ is the temperature parameter, E is the expectation operator, $a_t$ is an action sampled from the probability distribution generated by the policy neural network $\pi_t$ for a t-th tuple by processing the state representation $s_t$ in the tuple in accordance with the current values of the policy parameters, and $\overline{H}$ is the minimum expected entropy value.

6. The method of claim 1, wherein determining the gradient comprises, for each of the tuples:

sampling an action from the probability distribution generated by the policy neural network for the tuple; and determining a difference between (i) a negative of a logarithm of the probability assigned to the sampled action by the probability distribution and (ii) the minimum expected entropy value.

7. A system comprising one or more computers and one or more storage devices storing instructions that when executed by one or more computers cause the one or more computers to perform operations for training a policy neural network having a plurality of policy parameters and used to control a robot interacting with an environment, wherein the policy neural network is configured to receive as input a state representation characterizing a state of the environment and to process the state representation in accordance with the policy parameters to generate a policy output that defines a probability distribution over a set of actions that can be performed by the robot, the operations comprising:

obtaining trajectory data comprising one or more tuples, each tuple identifying a state representation characterizing a state of the environment, an action performed by the robot when the environment was in the state characterized by the state representation, a reward received in response to the robot performing the action, and a next state representation characterizing a next state of the environment after the robot performed the action;

updating, using the trajectory data, current values of the policy parameters, the updating comprising:

determining first gradients of a maximum entropy reinforcement learning objective that includes (i) a reward term that measures total rewards in the tuples in the trajectory data and (ii) an entropy term that measures an entropy of probability distributions defined by policy outputs generated by processing the state representations in the tuples in the trajectory data in accordance with the current values of the policy parameters, wherein a relative weight between the entropy term and the reward term in the maximum entropy reinforcement learning objective is determined by a temperature parameter, and updating the current values of the policy parameters using the first gradients;

updating, using the probability distributions defined by the policy outputs generated in accordance with the current values of the policy parameters for the tuples in the trajectory data, the temperature parameter, comprising:

determining a second gradient with respect to the temperature parameter of a second objective function that regulates an expected entropy of the probability distributions to at least equal a minimum expected entropy value, and updating the temperature parameter using the second gradient; and controlling the robot using the policy neural network and in accordance with the updated values of the policy parameters.

8. The system of claim 7, wherein the second objective function depends on, for each of the probability distributions, the temperature parameter, the entropy of the probability distribution, and the minimum expected entropy value.

9. The system of claim 8, wherein the minimum expected entropy value is based on a number of action dimensions in the actions in the possible set of actions.

10. The system of claim 9, wherein the minimum expected entropy value is a negative of the number of action dimensions.

11. The system of claim 8, wherein the second objective function satisfies:

$$J(\alpha)=E_{a_t \sim \pi_t}[-\alpha \log \pi_t(a_t|s_t)-\alpha \overline{H}],$$

where $\alpha$ is the temperature parameter, E is the expectation operator, $a_t$ is an action sampled from the probability distribution generated by the policy neural network $\pi_t$ for a t-th tuple by processing the state representation $s_t$ in the tuple in accordance with the current values of the policy parameters, and $\overline{H}$ is the minimum expected entropy value.

12. The system of claim 7, wherein determining the gradient comprises, for each of the tuples:

sampling an action from the probability distribution generated by the policy neural network for the tuple; and determining a difference between (i) a negative of a logarithm of the probability assigned to the sampled action by the probability distribution and (ii) the minimum expected entropy value.

13. One or more non-transitory computer readable storage media storing instructions that when executed by one or more computers cause the one or more computers to perform operations for training a policy neural network having a plurality of policy parameters and used to control a robot interacting with an environment, wherein the policy neural network is configured to receive as input a state representation characterizing a state of the environment and to process the state representation in accordance with the policy parameters to generate a policy output that defines a probability distribution over a set of actions that can be performed by the robot, the operations comprising:

obtaining trajectory data comprising one or more tuples, each tuple identifying a state representation characterizing a state of the environment, an action performed by the robot when the environment was in the state characterized by the state representation, a reward received in response to the robot performing the action, and a next state representation characterizing a next state of the environment after the robot performed the action;

updating, using the trajectory data, current values of the policy parameters, the updating comprising:

determining first gradients of a maximum entropy reinforcement learning objective that includes (i) a reward term that measures total rewards in the tuples in the trajectory data and (ii) an entropy term that measures an entropy of probability distributions defined by policy outputs generated by processing the state representations in the tuples in the trajectory data in accordance with the current values of the policy parameters, wherein a relative weight between the entropy term and the reward term in the maximum entropy reinforcement learning objective is determined by a temperature parameter, and updating the current values of the policy parameters using the first gradients;

updating, using the probability distributions defined by the policy outputs generated in accordance with the current values of the policy parameters for the tuples in the trajectory data, the temperature parameter, comprising:

determining a second gradient with respect to the temperature parameter of a second objective function that regulates an expected entropy of the probability distributions to at least equal a minimum expected entropy value, and updating the temperature parameter using the second gradient; and controlling the robot using the policy neural network and in accordance with the updated values of the policy parameters.

14. The one or more non-transitory computer readable storage media of claim 13, wherein the second objective function depends on, for each of the probability distributions, the temperature parameter, the entropy of the probability distribution, and the minimum expected entropy value.

15. The one or more non-transitory computer readable storage media of claim 14, wherein the minimum expected entropy value is based on a number of action dimensions in the actions in the possible set of actions.

16. The one or more non-transitory computer readable storage media of claim 15, wherein the minimum expected entropy value is a negative of the number of action dimensions.

17. The one or more non-transitory computer readable storage media of claim 14, wherein the second objective function satisfies:

$$J(\alpha)=E_{a_t \sim \pi_t}[-\alpha \log \pi_t(a_t|s_t)-\alpha \overline{H}],$$

where $\alpha$ is the temperature parameter, E is the expectation operator, $a_t$ is an action sampled from the probability distribution generated by the policy neural network $\pi_t$ for a t-th tuple by processing the state representation $s_t$ in the tuple in accordance with the current values of the policy parameters, and $\overline{H}$ is the minimum expected entropy value.

18. The one or more non-transitory computer readable storage media of claim 13, wherein determining the gradient comprises, for each of the tuples:

sampling an action from the probability distribution generated by the policy neural network for the tuple; and determining a difference between (i) a negative of a logarithm of the probability assigned to the sampled action by the probability distribution and (ii) the minimum expected entropy value.

* * * * *